(12) United States Patent
Ranford

(10) Patent No.: US 8,405,677 B2
(45) Date of Patent: Mar. 26, 2013

(54) METHOD OF IMPROVING THE ACCURACY OF SELECTING A SOFT BUTTON DISPLAYED ON A TOUCH-SENSITIVE SCREEN AND RELATED PORTABLE ELECTRONIC DEVICE

(75) Inventor: Paul Ranford, Auckland (NZ)

(73) Assignee: Mitac International Corp., Kuei-Shan Hsiang, Tao-Yuan Hsien (TW)

( * ) Notice: Subject to any disclaimer, the term of this patent is extended or adjusted under 35 U.S.C. 154(b) by 704 days.

(21) Appl. No.: 12/556,565

(22) Filed: Sep. 9, 2009

(65) Prior Publication Data

US 2011/0057956 A1    Mar. 10, 2011

(51) Int. Cl.
*G09G 5/00* (2006.01)

(52) U.S. Cl. ........ 345/619; 345/581; 345/660; 345/670; 345/671

(58) Field of Classification Search .................. None
See application file for complete search history.

(56) References Cited

U.S. PATENT DOCUMENTS

| 6,073,036 | A  | * | 6/2000 | Heikkinen et al. | 455/550.1 |
| 7,434,177 | B1 | * | 10/2008 | Ording et al. | 715/862 |
| 7,526,738 | B2 |   | 4/2009 | Ording | |
| 2006/0022955 | A1 |   | 2/2006 | Kennedy | |
| 2006/0232551 | A1 | * | 10/2006 | Matta | 345/156 |
| 2007/0030256 | A1 | * | 2/2007 | Akaike et al. | 345/173 |
| 2010/0313120 | A1 | * | 12/2010 | Ho et al. | 715/261 |

FOREIGN PATENT DOCUMENTS

TW    200837575    9/2008

\* cited by examiner

*Primary Examiner* — Kee M Tung
*Assistant Examiner* — Jwalant Amin
(74) *Attorney, Agent, or Firm* — Winston Hsu; Scott Margo

(57) ABSTRACT

A method of inputting commands through a touch-sensitive screen of a portable electronic device includes displaying a plurality of soft buttons on the touch-sensitive screen, detecting touch input on the touch-sensitive screen at a touch location, identifying a closest soft button that is nearest to the touch location, magnifying the closest soft button and one or more other soft buttons in the immediate vicinity of the closest soft button that are located in a same row or in a same column as the closest soft button, reducing the size of other soft buttons, detecting release of the touch input on the touch-sensitive screen at a release location after the soft buttons have been magnified, identifying a selected soft button located at the release location upon detecting release of the touch input, and executing a command corresponding to the selected soft button.

12 Claims, 7 Drawing Sheets

METHOD OF IMPROVING THE ACCURACY OF SELECTING A SOFT BUTTON DISPLAYED ON A TOUCH-SENSITIVE SCREEN AND RELATED PORTABLE ELECTRONIC DEVICE

BACKGROUND OF THE INVENTION

1. Field of the Invention

The invention relates to a portable electronic device having a touch-sensitive screen, and more particularly, to a method of modifying the size of soft buttons displayed on a touch-sensitive screen of an electronic device for improving the accuracy of selecting a soft button.

2. Description of the Prior Art

Touch-sensitive screens are becoming a popular way to enter text and commands into a portable electronic device. However, as the size of portable electronic devices shrinks, so does the size of the touch-sensitive screens. Therefore, it becomes harder to accurately select a soft button displayed on the touch-sensitive screen without accidentally selecting a different soft button that neighbors the soft button that was intended to be selected.

When an incorrect soft button is selected by a user, the user has to go back and correct the incorrect entry, causing the user to spend a greater deal of time entering text and leading to increased frustration.

Attempts have been made in the prior art to help solve this problem. FIG. 6 shows a prior art phone 200 having a soft button that is magnified in response to receiving touch input on a touch-sensitive screen 206. This phone 200 has been marketed as an iPhone® sold by Apple, Inc. When the touch-sensitive screen 206 is pressed, a soft button 204 corresponding to the touch position is magnified, while the size of all other soft buttons 202 remains unchanged. In the example shown in FIG. 6, the soft button 204 is located under the user's finger, and displays the letter "U". Thus, the prior art provides a way for showing the user's selection and allowing the user to correct. The prior art does not magnify the other nearby soft buttons 202 for assisting in the user's next selection.

FIG. 7 shows a prior art task bar 250 illustrating another example of magnification in a user interface. This task bar 250 is known as the Dock in Mac OS®, which is an operating system made by Apple, Inc. In order to select an item in the task bar 250, the user points the mouse at an icon and clicks on the icon. In order to assist the user with selecting an icon, icons magnify as the user moves the mouse cursor over them. In other words, the mouse acts as a magnifying class as it passes over the icons of the task bar 250. In FIG. 7, when the mouse is over icon 258, icon 258 is magnified the greatest amount of all the icons. Icons 256 and 260 are adjacent to icon 258, and are magnified slightly less than icon 258. Icons 254 and 262 are each two icons away from icon 258, and are magnified slightly less than icons 256 and 260. All other icons 252 are unmagnified and are shown in their normal size. One point worth noting is the task bar 250 is not used in conjunction with a touch-sensitive screen, and is not used to select soft buttons of a keyboard. The icon magnification is also regarded as a special graphical effect, and is not intended for assisting in accuracy of the user's selection.

SUMMARY OF THE INVENTION

It is therefore an objective of the claimed invention to provide a method of accurately inputting commands through a touch-sensitive screen of a portable electronic device.

According to an exemplary embodiment of the claimed invention, a method of inputting commands through a touch-sensitive screen of a portable electronic device is disclosed. The method includes displaying a plurality of soft buttons on the touch-sensitive screen, detecting touch input on the touch-sensitive screen at a touch location, identifying a closest soft button that is nearest to the touch location, magnifying the closest soft button and one or more other soft buttons in the immediate vicinity of the closest soft button that are located in a same row or in a same column as the closest soft button, reducing the size of soft buttons other than the magnified soft buttons located in the same row or the same column as the closest soft button, detecting release of the touch input on the touch-sensitive screen at a release location after the soft buttons have been magnified, identifying a selected soft button located at the release location upon detecting release of the touch input, and executing a command corresponding to the selected soft button.

According to another exemplary embodiment of the claimed invention, a portable electronic device receiving input commands through a touch-sensitive screen is disclosed. The portable electronic device includes a touch-sensitive screen for displaying a plurality of soft buttons on the touch-sensitive screen and detecting touch input on the touch-sensitive screen at a touch location. The portable electronic device also contains a processor for identifying a closest soft button that is nearest to the touch location, controlling the touch-sensitive screen to magnify the closest soft button and one or more other soft buttons in the immediate vicinity of the closest soft button that are located in a same row or in a same column as the closest soft button, controlling the touch-sensitive screen to reduce the size of soft buttons other than the magnified soft buttons located in the same row or the same column as the closest soft button, receiving data from the touch-sensitive screen indicating release of the touch input on the touch-sensitive screen at a release location after the soft buttons have been magnified, identifying a selected soft button located at the release location upon detecting release of the touch input, and executing a command corresponding to the selected soft button.

It is an advantage that the portable electronic device of the present invention magnifies the size of soft buttons in near proximity to a location of the touch-sensitive screen that was touched. In this way, the user of the portable electronic device can take advantage of the magnification to more accurately select a soft button without accidentally selecting a wrong soft button.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
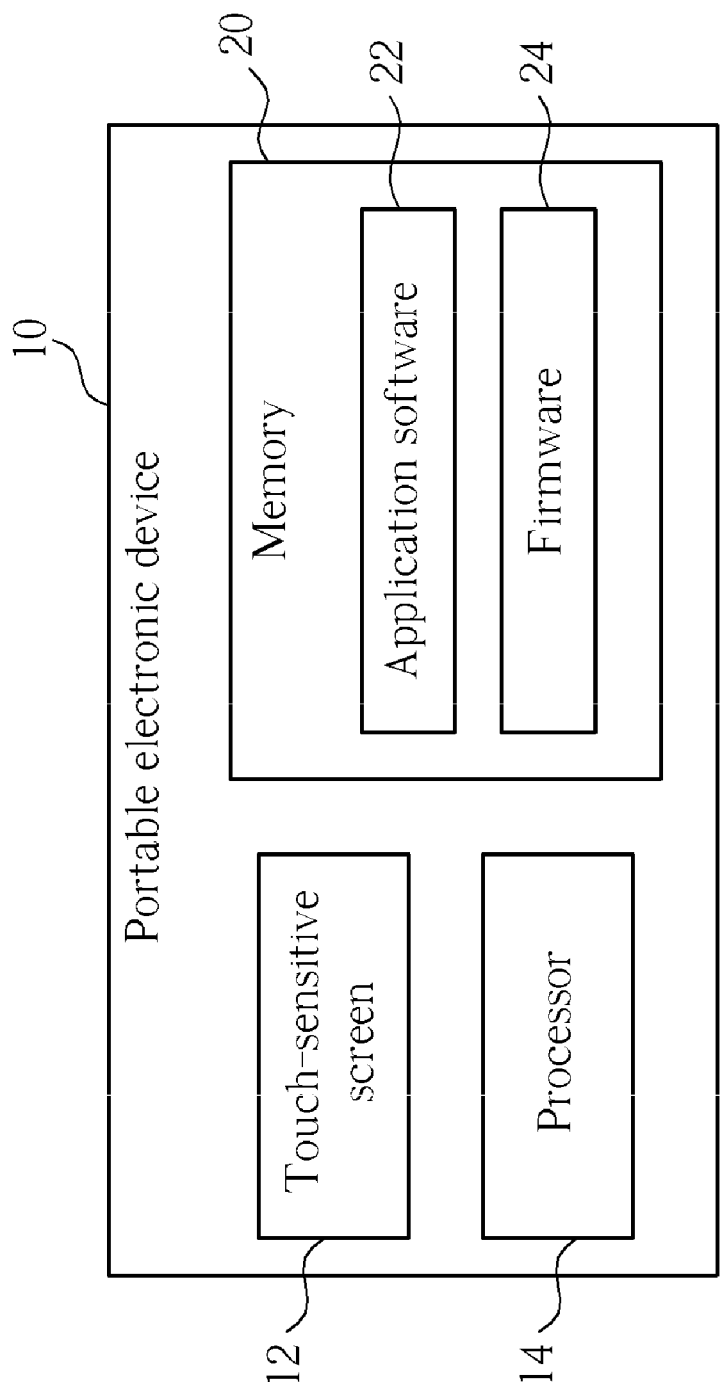
FIG. 1 is a functional block diagram showing a portable electronic device having a touch-sensitive screen according to the present invention.

Please refer to FIG. 1. FIG. 1 is a functional block diagram showing a portable electronic device 10 having a touch-sensitive screen 12 according to the present invention. The portable electronic device 10 may be a personal navigation device, a smartphone, a personal digital assistant (PDA), or any other portable electronic device that can utilize the touch-sensitive screen 12 for entering text, commands, and data. The portable electronic device 10 also contains a processor 14 for controlling operation of the portable electronic device 10 as well as executing application software 22 and firmware 24 stored in memory 20.

Figure 2:
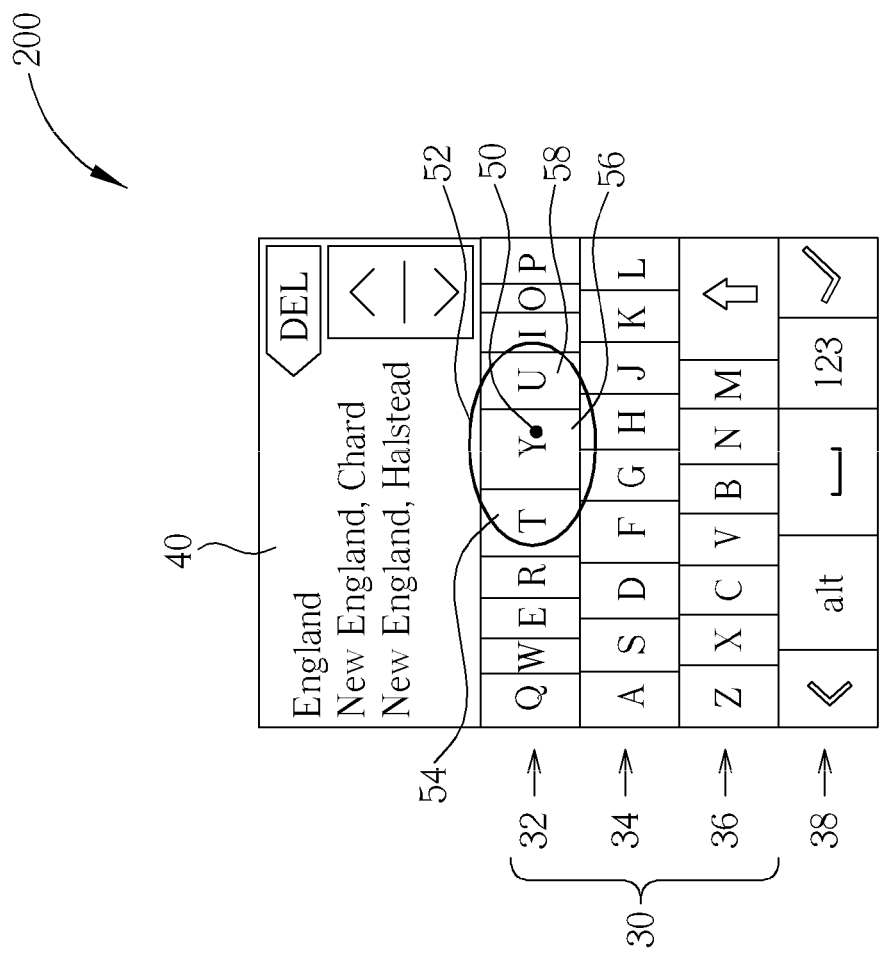
FIG. 2 illustrates a method of inputting commands according to a first embodiment of the present invention.

Please refer to FIG. 2, which illustrates a method of inputting commands according to a first embodiment of the present invention. FIG. 2 shows a screenshot 200 in which a QWERTY keyboard 30 is displayed on the touch-sensitive screen 12. The screenshot 200 shows the QWERTY keyboard 30 containing three rows 32, 34, and 36 of soft buttons. In addition, the screenshot 200 also contains an extra row 38 of function keys as well as a text display area 40 for showing displayed text. A touch point 50 is shown where a user of the portable electronic device 10 touches the touch-sensitive screen 12. When the processor 14 determines the position of the touch point 50, soft buttons in the immediate vicinity of the touch point 50 are magnified. As shown in FIG. 2, the touch point 50 is located on soft button 56, and the soft button 56 along with other soft buttons 54 and 58 within magnification area 52 are also magnified. As can be seen, the soft buttons 54, 56, and 58 are all located in row 32 of the QWERTY keyboard 30. To make room for the magnified soft buttons 54, 56, and 58, the sizes of other soft buttons in row 32 are reduced. When the user's finger moves on the touch-sensitive screen 12, the processor 14 is able to detect and identify the position of the touch point 50, and will respond to the change by magnifying and reducing the corresponding soft buttons.

In the first embodiment, when receiving touch input at the touch point 50, the processor 14 will determine which soft button is closest to the touch point 50. The closest soft button 56 to the touch point 50 along with one or more other soft buttons 54 and 58 in the immediate vicinity of the closest soft button 56 that are located in a same row 32 as the closest soft button 56 are then magnified, with other soft buttons in that row 32 being reduced in size. FIG. 2 only shows magnifying soft buttons that are located in the same row 32, but soft buttons located in a same column could be magnified instead.

Figure 3:
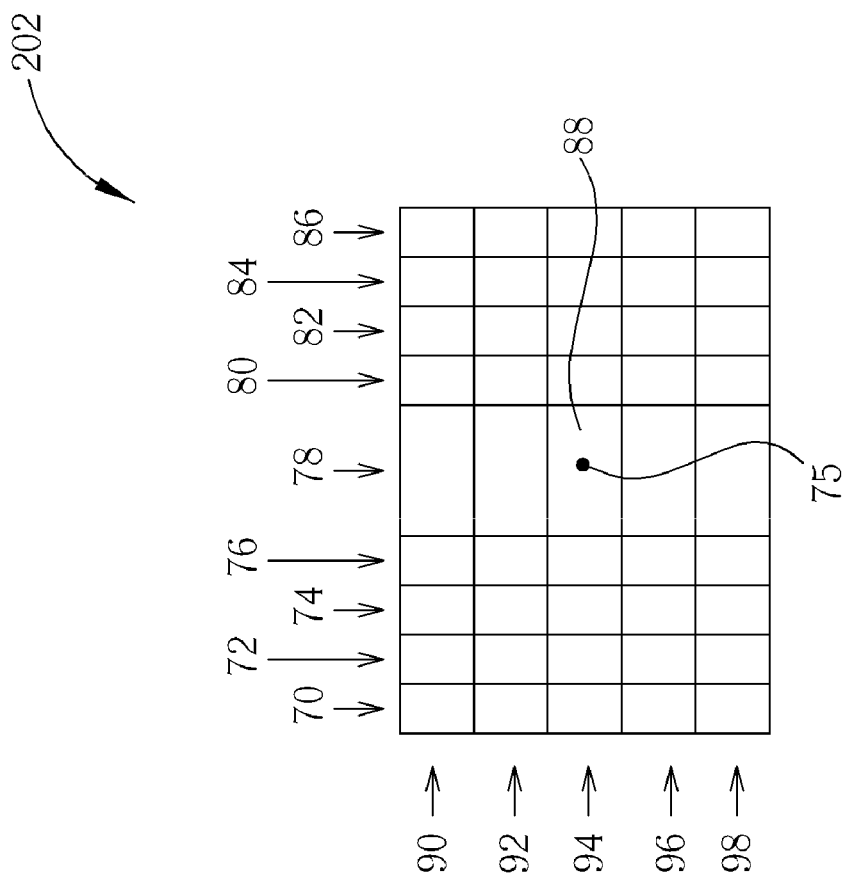
FIG. 3 illustrates a method of inputting commands according to a second embodiment of the present invention.

Please refer to FIG. 3, which illustrates a method of inputting commands according to a second embodiment of the present invention. FIG. 3 shows a screenshot 202 having a plurality of soft buttons arranged in columns 70, 72, 74, 76, 78, 80, 82, 84, and 86 and in rows 90, 92, 94, 96, and 98. In FIG. 3, touch input is received on the touch-sensitive screen 12 at a touch point 75, corresponding to a closest soft button 88. All soft buttons that are in the same column 78 as the closest soft button 88 are magnified. In this case, magnifying the column 78 of soft buttons means that the soft buttons in column 78 are stretched horizontally. To make room for the magnified soft buttons in column 78, the soft buttons in other columns 70, 72, 74, 76, 80, 82, 84, and 86 are reduced in size. Reducing the size of soft buttons in the other columns 70, 72, 74, 76, 80, 82, 84, and 86 can entail reducing the size of all or only some of the columns 70, 72, 74, 76, 80, 82, 84, and 86.

In the second embodiment, when receiving touch input at the touch point 75, the processor 14 will determine which soft button is closest to the touch point 75. The closest soft button 88 to the touch point 75 along with all of the other soft buttons in the same column 78 as the closest soft button 88 are then magnified, with soft buttons in some or all of the other columns 70, 72, 74, 76, 80, 82, 84, and 86 being reduced. FIG. 3 only shows magnifying soft buttons that are located in the same column 78, but soft buttons located in a same row could be magnified instead.

Figure 4:
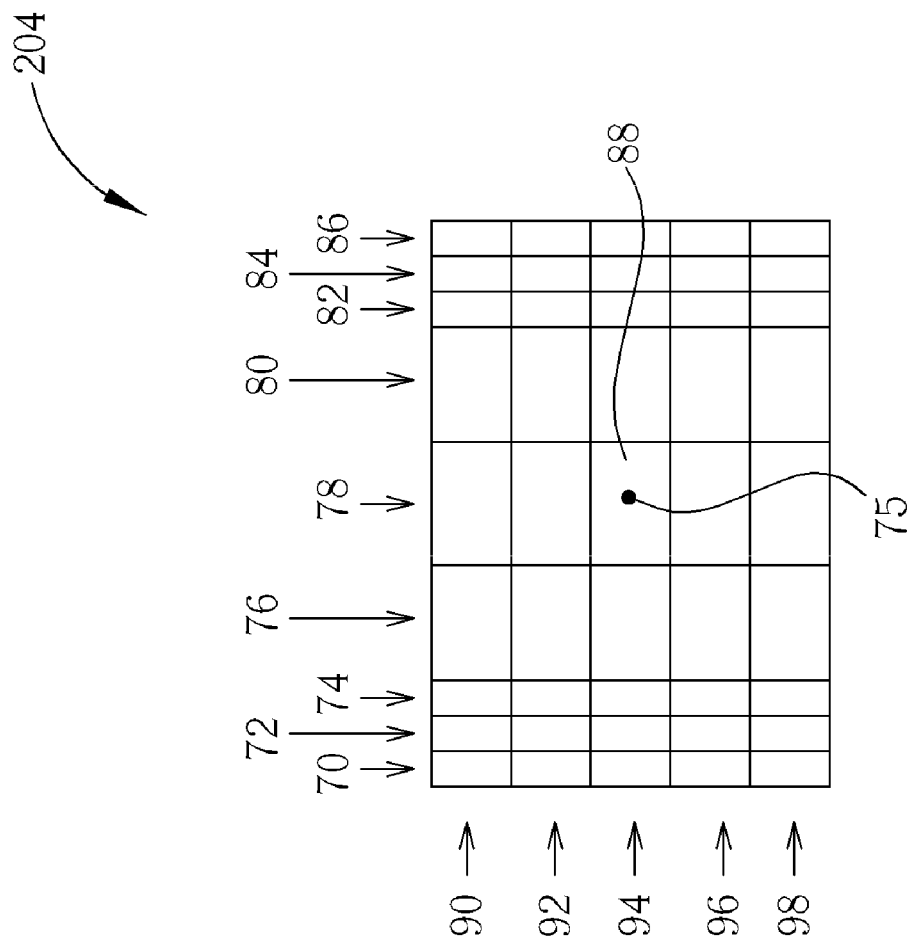
FIG. 4 illustrates a method of inputting commands according to a third embodiment of the present invention.

Please refer to FIG. 4, which illustrates a method of inputting commands according to a third embodiment of the present invention. FIG. 4 shows a screenshot 204 similar to the screenshot 202 and also having a plurality of soft buttons arranged in columns 70, 72, 74, 76, 78, 80, 82, 84, and 86 and in rows 90, 92, 94, 96, and 98. In FIG. 4, touch input is received on the touch-sensitive screen 12 at the touch point 75, corresponding to the closest soft button 88. All soft buttons that are in the same column 78 as the closest soft button 88 are magnified. In addition, and differing from the second embodiment shown in FIG. 3, the soft buttons in one or more columns 76 and 80 neighboring the column 78 are also magnified. In this case, magnifying the columns 76, 78, and 80 of soft buttons means that the soft buttons in columns 76, 78, and 80 are stretched horizontally. To make room for the magnified soft buttons in columns 76, 78, and 80, the soft buttons in other columns 70, 72, 74, 82, 84, and 86 are reduced in size. Reducing the size of soft buttons in the other columns 70, 72, 74, 82, 84, and 86 can entail reducing the size of all or only some of the columns 70, 72, 74, 82, 84, and 86.

In the third embodiment, when receiving touch input at the touch point 75, the processor 14 will determine which soft button is closest to the touch point 75. The closest soft button 88 to the touch point 75 along with all of the other soft buttons in the same column 78 as the closest soft button 88 are then magnified, and the soft buttons in one or more neighboring columns 76 and 80 are magnified as well. The soft buttons in some or all of the other columns 70, 72, 74, 82, 84, and 86 are then reduced. FIG. 4 only shows magnifying soft buttons that are located in column 78 and neighboring columns 76 and 80, but soft buttons located in a row containing the closest soft button 88 and neighboring rows could be magnified instead.

Figure 5:
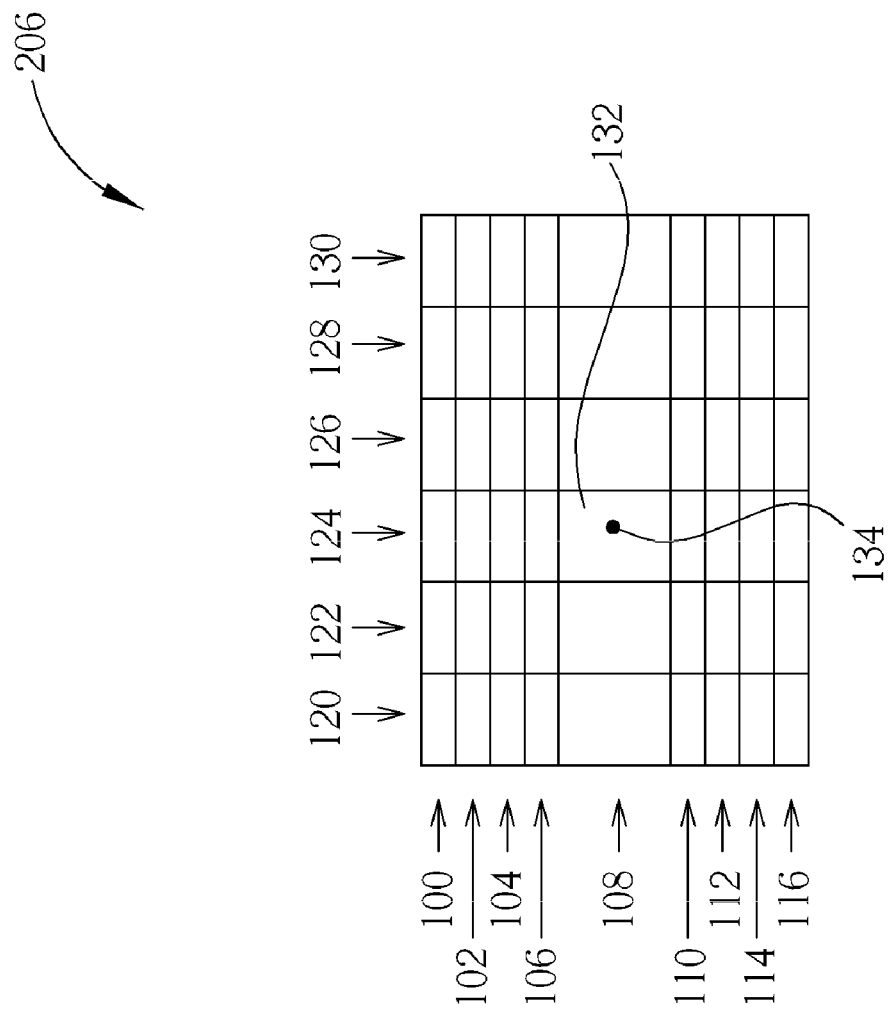
FIG. 5 illustrates a method of inputting commands according to a fourth embodiment of the present invention.
Figure 6:
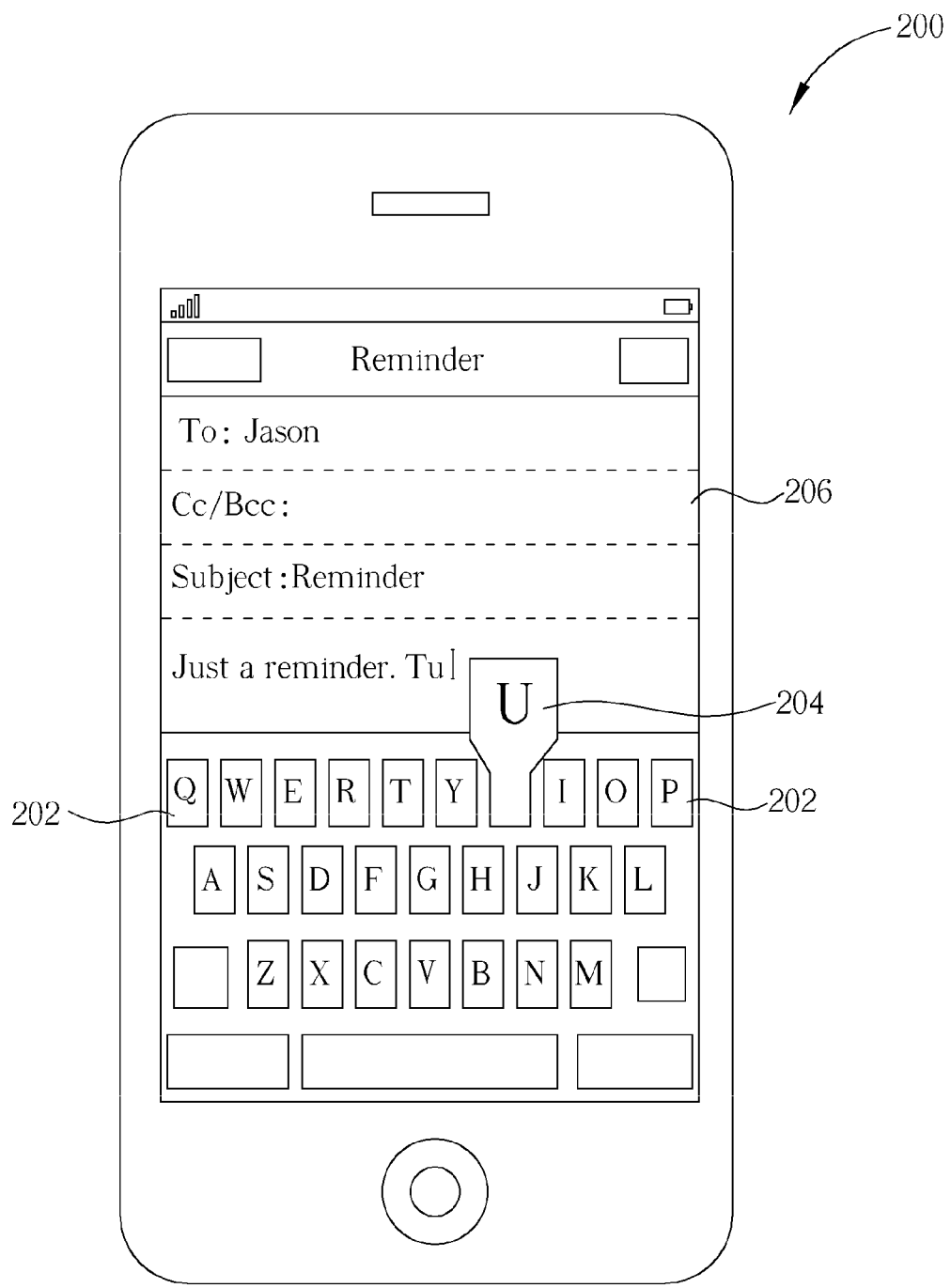
FIG. 6 shows a prior art phone having a soft button that is magnified in response to receiving touch input on a touch-sensitive screen.
Figure 7:
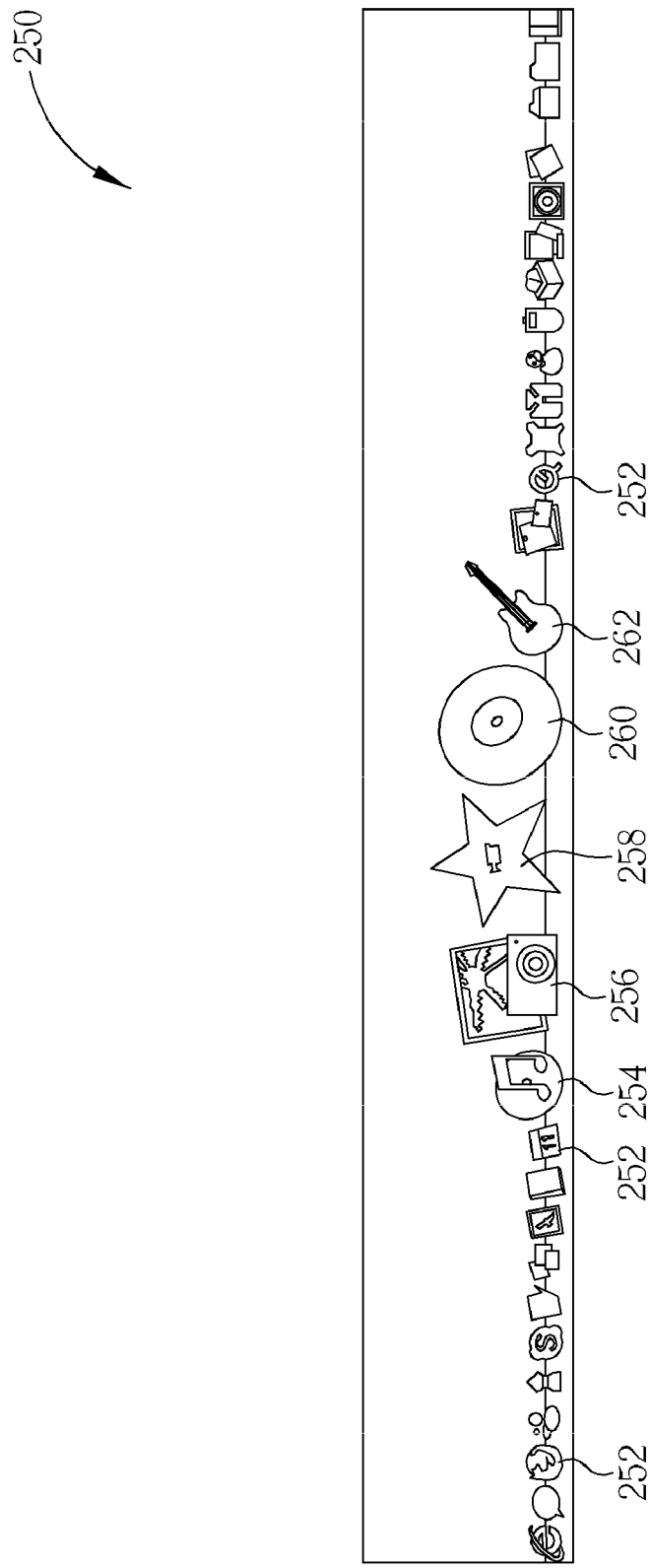
FIG. 7 shows a prior art task bar illustrating another example of magnification in a user interface.

Please refer to FIG. 5, which illustrates a method of inputting commands according to a fourth embodiment of the present invention. FIG. 5 shows a screenshot 206 having a plurality of soft buttons arranged in rows 100, 102, 104, 106, 108, 110, 112, 114, and 116 and in columns 120, 122, 124, 126, 128, and 130. In FIG. 5, touch input is received on the touch-sensitive screen 12 at a touch point 134, corresponding to a closest soft button 132. Differing from the previous embodiments, all soft buttons that are in the same row 108 as the closest soft button 132 are magnified. In this case, magnifying the row 108 of soft buttons means that the soft buttons in row 108 are stretched vertically. To make room for the magnified soft buttons in row 108, the soft buttons in other rows 100, 102, 104, 106, 110, 112, 114, and 116 are reduced in size. Reducing the size of soft buttons in the other rows 100, 102, 104, 106, 110, 112, 114, and 116 can entail reducing the size of all or only some of the rows 100, 102, 104, 106, 110, 112, 114, and 116.

In the fourth embodiment, when receiving touch input at the touch point 134, the processor 14 will determine which soft button is closest to the touch point 134. The closest soft button 132 to the touch point 134 along with all of the other soft buttons in the same row 108 as the closest soft button 132 are then magnified, and the soft buttons in some or all of the other rows 100, 102, 104, 106, 110, 112, 114, and 116 are then reduced.

In a QWERTY keyboard or another similar arrangement of soft buttons that is longer in one dimension than another, displaying the soft buttons in portrait mode or landscape mode can affect how the magnification and reduction of soft buttons is performed. For example, the screenshot 202 illustrated in FIG. 3 is representative of an image displayed in landscape mode since the longer dimension is horizontal. In landscape mode, soft buttons can be stretched horizontally as shown in column 78 of FIG. 3. Soft buttons in other columns 70, 72, 74, 76, 80, 82, 84, and 86 are reduced. The screenshot 206 illustrated in FIG. 5 is representative of an image displayed in portrait mode since the longer dimension is vertical. In portrait mode, soft buttons can be stretched vertically as shown in row 108 of FIG. 5. Soft buttons in other rows 100, 102, 104, 106, 110, 112, 114, and 116 are reduced. Besides magnifying only soft buttons located in the same rows or in the same columns, soft buttons located in both rows and columns neighboring the closest soft button to the touch point can also be magnified, with other rows and columns being reduced in sized.

In summary, the present invention allows a user to more clearly see soft buttons before committing to a choice of a soft button. When the user touches the touch-sensitive screen 12 at a touch point, soft buttons in the immediate vicinity of the touch point are magnified, allowing the user to more accurately select an intended soft button. Then, when the user stops touching the touch-sensitive screen 12, the location where the touch was released is considered to be the location that the user intended to select, and a soft button corresponding to the release location is selected for activation. An action corresponding to that selected soft button is then executed after the user releases their finger from the touch-sensitive screen 12.

Those skilled in the art will readily observe that numerous modifications and alterations of the device and method may be made while retaining the teachings of the invention.

What is claimed is:

1. A method of inputting commands through a touch-sensitive screen of a portable electronic device, the method comprising:
    displaying a plurality of soft buttons on the touch-sensitive screen;
    detecting touch input on the touch-sensitive screen at a touch location;
    identifying a closest soft button that is nearest to the touch location;
    magnifying the closest soft button, magnifying the entire row or the entire column of soft buttons that the closest soft button is located in, and magnifying one or more other rows or columns of soft buttons in the immediate vicinity of the row or column that the closest soft button is located in;
    reducing the size of soft buttons other than the magnified soft buttons;
    detecting release of the touch input on the touch-sensitive screen at a release location after the soft buttons have been magnified;
    identifying a selected soft button located at the release location upon detecting release of the touch input; and
    executing a command corresponding to the selected soft button.

2. The method of claim 1 further comprising:
    detecting movement of the touch location to a new touch location while touch input is still received on the touch-sensitive screen;
    identifying a new closest soft button that is nearest to the new touch location; and
    magnifying the new closest soft button and magnifying the entire row or the entire column of soft buttons that the new closest soft button is located in while not magnifying other soft buttons.

3. The method of claim 1 further comprising reducing the size of soft buttons located in rows or columns other than the magnified soft buttons located in the rows or columns in the immediate vicinity of the row or column that the closest soft button is located in.

4. The method of claim 1, wherein the plurality of soft buttons form a QWERTY keyboard.

5. The method of claim 4, wherein when the QWERTY keyboard is oriented in portrait mode, the closest soft button and the entire row of soft buttons that the closest soft button is located in are magnified.

6. The method of claim 4, wherein when the QWERTY keyboard is oriented in landscape mode, the closest soft button and the entire column of soft buttons that the closest soft button is located in are magnified.

7. A portable electronic device receiving input commands through a touch-sensitive screen, the portable electronic device comprising:
    a touch-sensitive screen for displaying a plurality of soft buttons on the touch-sensitive screen and detecting touch input on the touch-sensitive screen at a touch location; and
    a processor for identifying a closest soft button that is nearest to the touch location, controlling the touch-sensitive screen to magnify the closest soft button, the entire row or the entire column of soft buttons that the closest soft button is located in, and one or more other rows or columns of soft buttons in the immediate vicinity of the row or column that the closest soft button is located in, controlling the touch-sensitive screen to reduce the size of soft buttons other than the magnified soft buttons, receiving data from the touch-sensitive screen indicating release of the touch input on the touch-sensitive screen at a release location after the soft buttons have been magnified, identifying a selected soft button located at the release location upon detecting release of the touch input, and executing a command corresponding to the selected soft button.

8. The portable electronic device of claim 7, wherein the processor detects movement of the touch location to a new touch location while touch input is still received on the touch-sensitive screen, identifies a new closest soft button that is nearest to the new touch location, and magnifies the new closest soft button and the entire row or the entire column of soft buttons that the new closest soft button is located in while not magnifying other soft buttons.

9. The portable electronic device of claim 7, wherein the processor reduces the size of soft buttons located in rows or columns other than the magnified soft buttons located in the rows or columns in the immediate vicinity of the row or column that the closest soft button is located in.

10. The portable electronic device of claim 7, wherein the plurality of soft buttons form a QWERTY keyboard.

11. The portable electronic device of claim 10, wherein when the QWERTY keyboard is oriented in portrait mode, the closest soft button and the entire row of soft buttons that the closest soft button is located in are magnified.

12. The portable electronic device of claim 10, wherein when the QWERTY keyboard is oriented in landscape mode, the closest soft button and the entire column of soft buttons that the closest soft button is located in are magnified.

* * * * *